United States Patent [19]
Tadayon

[11] Patent Number: 5,147,546
[45] Date of Patent: Sep. 15, 1992

[54] CERAMIC FOAM FILTER BODY HAVING A GASKET CHEMICALLY AND MECHANICALLY BONDED THERETO

[75] Inventor: Fereshteh Tadayon, Hendersonville, N.C.

[73] Assignee: Alusuisse-Lonza Services Ltd., Zurich, Switzerland

[21] Appl. No.: 708,904

[22] Filed: May 31, 1991

Related U.S. Application Data

[62] Division of Ser. No. 356,076, May 24, 1989, Pat. No. 5,030,482.

[51] Int. Cl.⁵ .............................................. B01D 29/05
[52] U.S. Cl. ..................... 210/506; 210/508; 210/509; 210/510.1
[58] Field of Search ............ 210/506, 508, 509, 510.1

[56] References Cited

U.S. PATENT DOCUMENTS

| | | | |
|---|---|---|---|
| 4,265,659 | 5/1981 | Blome | 210/510.1 |
| 4,331,621 | 5/1982 | Brockmeyer | 264/44 |
| 4,338,353 | 7/1982 | Melchior | 427/350 |
| 4,866,011 | 9/1989 | Hargus et al. | 210/506 |

*Primary Examiner*—Michael Lusignan
*Assistant Examiner*—Benjamin L. Utech
*Attorney, Agent, or Firm*—Bachman & LaPointe

[57] ABSTRACT

The present invention relates to ceramic foam filters having a gasket material chemically and mechanically bonded thereto. The filters have particular utility in the filtration of molten metal, especially aluminum. The filters are formed by immersing the porous filter body, preferably in a fired condition, in a gasketing medium consisting of a concentration of ceramic fibers, one or more binders, and the balance a vehicle such as water and applying a vacuum through the porous filter to draw the gasketing medium into contact with the portions of the filter body to be gasketed.

10 Claims, 1 Drawing Sheet

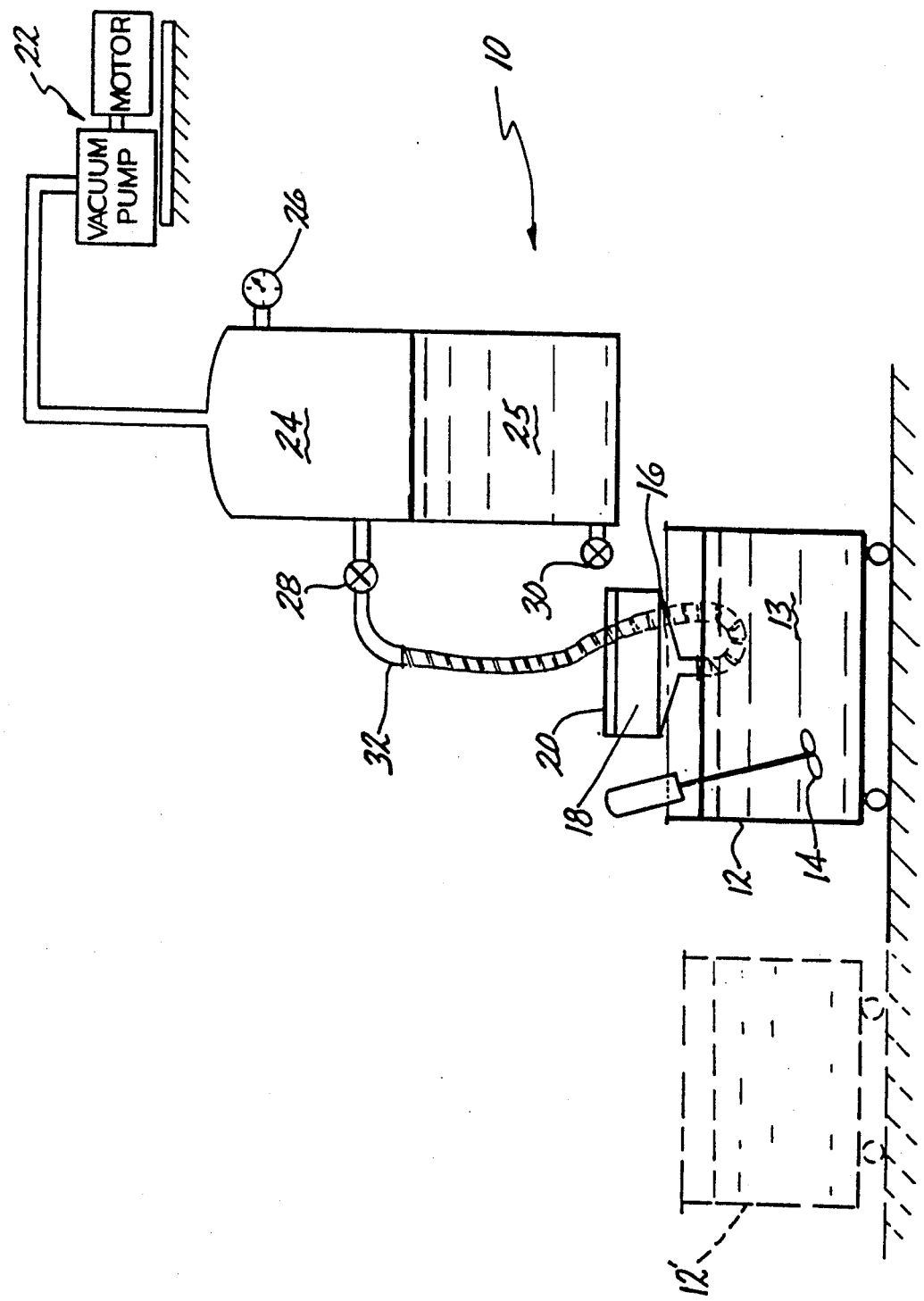

CERAMIC FOAM FILTER BODY HAVING A GASKET CHEMICALLY AND MECHANICALLY BONDED THERETO

This is a division of application Ser. No. 356,076 filed May 24, 1989, now U.S. Pat. No. 5,030,482.

BACKGROUND OF THE INVENTION

The present invention relates to a ceramic foam filter having an integral gasket and a method of forming the filter.

Molten metal, particularly molten aluminum, in practice generally contains entrained solids which are deleterious to the final cast metal product. These entrained solids appear as inclusions in the final cast product after the molten metal is solidified and cause the final product to be less ductile or to have poor bright finishing and anodizing characteristics. The inclusions may originate from several sources. For example, the inclusions may originate from surface oxide films which become broken up and are entrained in the molten metal. In addition the inclusions may originate as insoluble impurities, such as carbides, borides and others or eroded furnace and trough refractories.

Porous ceramic foam materials are known to be particularly useful in filtering molten metal, as described in U.S. Pat. No. 3,893,917 for "Molten Metal Filter" by Michael J. Pryor et al., patented Jul. 8, 1975, and also as described in U.S. Pat. No. 3,947,363 for "Ceramic Foam Filter" by Michael J. Pryor et al., patented Mar. 30, 1976 and U.S. Pat. No. 4,081,371 for "Filtering of Molten Metal" by John C. Yarwood et al., patented, Mar. 28, 1978, all of which are assigned to the assignee of the instant invention and incorporated herein by reference.

These ceramics foam materials are particularly useful for filtering molten metal for a variety of reasons included among which are their excellent filtration efficiency, low cost, ease of use and ability to use same on disposable, throwaway basis. The fact that these ceramic foam filters are convenient and inexpensive to prepare and may be used on a throwaway basis requires the development of means for easily and conveniently assembling and removing porous, molten metal filters from a filtration unit while providing a highly efficient filtration assembly. Since the filters are designed to be a throwaway item, it is essential to provide an effective means of sealing the filters in place in its holder which is easy to assemble, disassemble and clean up. The holder or filter chamber itself is normally an integral part of a trough, pouring pan or tundish etc. and should be constructed of refractory materials resistant to the molten metal similar to those used in standard trough construction.

It is greatly preferred to seal the filter plate in place using a resilient sealing means or gasket type seal peripherally circumscribing the filter plate at the bevelled portion thereof. The gasket type seals ensure a leak free installation and also provide an effective parting medium which is essential for ease of disassembly. In addition, since the gasket or sealing means prevent ingress of metal to the sealing faces of the holder unit, their use considerably eases clean up and effectively prolongs the life of the unit by eliminating problems of metal attack. Furthermore, because of its resiliency, the gasket may provide sufficient frictional force to hold the filter body in place in the holder or filter chamber without resorting to other types of hold down devices. The resilient sealing means should be non-wetting to the particular molten metal, resist chemical attack therefrom and be refractory enough to withstand the high operating temperatures.

Heretofore, the ceramic foam filters were gasketed with pre-cut strips of low density ceramic fiber having an organic binder. The straight pre-cut strips were simply taped to the bevelled edges of the filters after the filter had been baked and fired. As a result of the foregoing process, a number of disadvantages arose. These disadvantages include: sagging and detachment of the gasket from the filter as the tape loosens up and peels off; tearing of the gasket in handling due to the fragile nature of the material resulting in metal bypass; giving off of undesirable and unhealthy fumes during pre-heating, due to the burn off of organic binders in the material, including carbon monoxide, carbon dioxide, hydrocarbons and formaldehyde; regassing of the melt due to binder gases which are given off; less than desirable appearance; and high economic cost due to the labor necessary to cut, fit and tape the gasket manually. Yet other disadvantages include the occurrence of misfits due to the pre-cut strips being straight and the filter edges being bevelled and the need to coat the filter edges with additional ceramic slurry in order to insure that the filter edges are not directly handled during further processing. Misfit is a particularly troublesome problem in that in some cases it results in the molten metal passing between the gasket and the filter plate.

Another gasketing technique for ceramic foam filter comprises applying an expandable gasketing material having an adhesive peel-off backing to the filter. The material is cut and fitted manually around the filter. One of the disadvantages of this approach is that the glue burns off along with the binders in the gasket and gives off undesirable fumes. Other disadvantages include: metal bypass of the joints due to poor fit and failure of the gasket to expand and seal the gap effectively; regassing of the melt where preheating is not done long enough at high enough temperature; loosening of the gasket material; possible mechanical failure of the filter due to uneven pressure exerted on the filter by over expansion of the gasket; and high economic costs associated with the gasket plus the labor involved in installing the gasket.

Attempts have been made to mold a gasket about a ceramic foam filter. U.S. Pat. No. 4,331,621 to Brockmeyer illustrates such an attempt. In accordance with this patent, a mold was provided having dimensions corresponding to the desired final filter size which is to be inserted in the filter bowl. A fired filter was placed in the center mold. The gap between the mold and filter was filled with gasketing material. After drying, the mold was taken off. These attempts failed because there was difficulty separating the mold from he gasket. There was also a lack of adherence of the gasket material to the filter.

Accordingly, it is an object of the present invention to provide a ceramic foam filter having a gasket material mechanically and chemically bonded thereto.

It is a further object of the present invention to provide a method of forming the desired gasketed filter while achieving utility, economical and aesthetic goals.

These and further objects and advantages will become more apparent from the following description and drawing in which like reference numerals depict like elements.

SUMMARY OF THE INVENTION

The improved ceramic foam filter of the present invention has particular utility in the filtration of molten metal, especially aluminum. The filter comprises a porous ceramic foam filter material having a gasket material bonded to peripheral edges of the material. The gasket material contains ceramic fibers such as aluminosilicate fibers and is bonded both chemically and mechanically to the underlying ceramic foam substrate material. By using the novel gasketing medium formulation described herein, it is possible to form a desirable gasket having an adhesion factor in the range of from about 0.05 to 10 pounds and preferably from about 1.8 to about 2.5 pounds, a compression factor in the range of from about 2 to 100 pounds and preferably from about 25 to about 42 pounds, and a density in the range of from about 0.05 to about 0.5 g/cc.

A novel method is used to form the filter of the present invention. This method comprises: providing a porous filter material, preferably a fired ceramic foam filter; providing a liquid gasketing medium containing ceramic fibers, at least one binder, and a solvent or vehicle such as water; immersing the material in the medium; and applying a vacuum through the filter material so as to cause said gasketing medium to be drawn to the periphery of the filter. Portions of the filter, such as the top and bottom surfaces, which are not to be gasketed are covered by rubber gaskets so as to avoid contact with the gasketing medium. If necessary, the filter may be subjected to a drying treatment after removal from the gasketing medium. The drying treatment has been found to be helpful in removing unwanted water from the filter.

It has been found that the present invention provides an improved filter with a better seal. As a result, better filtration is achieved. The filter also requires a shorter preheating time due to the use of low concentrations of simple binders and low temperature expansion materials. The present invention avoids the need to glue, tape or cement the gasket material to the filter substrate, eliminates regassing problems, and provides improved mechanical performance. The method is particularly advantageous in that no environmentally hazardous chemicals are used to form the gasket.

BRIEF DESCRIPTION OF THE DRAWINGS

The FIGURE is a schematic view of a vacuum system for forming the filters of the present invention.

DETAILED DESCRIPTION OF THE INVENTION

In accordance with the present invention, an improved ceramic foam filter having an integral gasket about its peripheral edges is provided. The improved filter is formed using the vacuum system of the FIGURE.

The vacuum system 10 includes a forming tank 12 for holding a liquid gasketing medium 13, a mixer 14 for insuring that the gasket medium constituents are properly mixed, a lower filter holder 16 upon which the porous filter material 18 to be gasketed rests, an upper filter holder 20, a vacuum pump and motor 22, a separator tank 24 containing water 25 for separating air from water and prohibiting water from entering the vacuum pump, a vacuum gauge 26, a vacuum control valve 28, a drain valve 30 and a flexible hose 32. The medium 13 may be mixed in the tank 12 or alternatively may be prepared in another tank not shown and transported to the tank 12. The lower and upper filter holders 16 and 20 in addition to supporting the filter material 18 assist in substantially preventing the gasketing medium from contacting the lower and upper surfaces of the filter material. As a result, the gasket is formed only about the peripheral side edges of the filter. The peripheral edges may be bevelled or may be straight.

The filter material 18 may comprise any suitable porous filter material known in the art although preferably it is a ceramic foam material such as that described in U.S. Pat. No. 3,893,917 by Michael J. Pryor et al., U.S. Pat. No. 3,947,363 by Michael J. Pryor et al., or U.S. Pat. No. 4,081,371 by John C. Yarwood et al. which are hereby incorporated by reference herein. The material may have any desired porosity. While the filter body may be in any desired condition, it is preferred that it be fired before it is immersed in the liquid gasketing medium 13.

In accordance with the present invention, the medium 13 is formulated so as to produce a gasket having a particularly advantageous set of physical properties. Broadly speaking, the medium 13 contains ceramic fibers of various lengths, at least one binder and the balance being a solvent or vehicle such as water or an alcohol.

The selection of the ceramic fibers for the medium is important from the standpoint of providing a gasket having a desired density and a desired surface texture. The requirements for the ceramic fibers include that they be non-wettable by molten metal, that they be stable at or above the melting point of liquid metal being filtered, e.g. for aluminum are stable above 1220° F. and that they be low density fibers. Ideally, the ceramic fibers should have a length in the range of from about 0.1 to about 100 mm and a diameter in the range of from about 0.1 to about 50 microns. The length of the fiber plays an important role in both density and surface texture. The longer the fiber for example, the rougher the gasket surface.

Suitable ceramic fibers which may be utilized in the medium 13 include but are not limited to alumina-silica fibers sold under the name "Carborundum 7000" and "Carborundum 7001". These fibers have a maximum length of 102 mm. and a diameter of 2-3 microns. This fiber material is a blend of short and long fibers.

The ceramic fibers are present in the medium 13 in a concentration in the range of from about 0.1 to about 15.0 g/l, preferably from about 2.0 to about 6.0 g/l.

The choice of a binder to be used in the medium 13 is also important if not critical. The type of binder, its concentration, and chemical affinity with other components in the system have to be considered during gasket formation, drying and preheating. It is the binder that serves to adhere the fibers to the filter body during the vacuum forming process. The gasketing medium 13 may contain one or more binders. For example, it may contain an inorganic binder such as colloidal silica and/or colloidal alumina, an organic binder such as starch or latex, or combinations of organic and inorganic binders.

Silica is a useful binder material in that it improves gasket texture and contributes to long term handling strength. When used, silica as colloidal silica maybe present in the medium in a concentration of from about 0.001 g/l to about 6.0 g/l, preferably from about 0.1 g/l to about 1.0 g/l. The concentration of silica is important because the higher the silica concentration, the stiffer the gasket. A filter with a stiff/unyielding gasket seats hard and pops out easily. A suitable silica binder which may be used is that known as Nalco AG 1140.

Another organic binder which may be used is a colloidal alumina binder system sold under the name Nalco ISJG14. It has been found that this material produces a very soft gasket with an excellent seating capacity. Another advantage of this binder system is its composition compatibility to the filter body. When used in the medium 13, colloidal alumina is present in concentration from about 0.005 g/l to about 0.03 g/l.

As previously discussed, latex and/or starch may also be used as binders. Latex, if used, may be present in a concentration in the range of about 0.03 g/l to about 0.05 g/l. Starches such as a cold water soluble, nitrogen containing potato starch with positive surface charge have been found to be particularly effective as binders either by itself or in conjunction with other binders such as colloidal silica. This type of starch is attracted to the ceramic fiber and the colloidal silica to the starch. This starch tends to act as a flocculand in the suspension. When used, starch is present in a concentration from about 0.001 g/l to about 3.5 g/l, preferably from about 0.05 g/l to about 0.5 g/l.

If one desires to form an expandable gasket, a magnesium - alumino-silicate material such as vermiculite may be added to the gasketing medium 13 in a concentration from about 0.5 g/l to about 6.0 g/l. It has been found that such an expandable gasket has a density, typically about 0.19–0.5 g/cc, which is usually higher than that of the non-expandable gasket, typically about 0.05–0.19 g/cc.

To form the filter of the present invention, the gasketing medium 13 is prepared by adding the ceramic fiber in the abovementioned concentration to one or more of the aforementioned binders and by adding a vehicle such as water. The ingredients are mixed together for a time period in the range of from about 5 minutes to about one hour and preferably from about 15 minutes to about 45 minutes.

After mixing is completed, the ceramic foam filter material 18 which has been previously been fired is immersed in the gasketing medium 13. The plate-like lower and upper holders 16 and 20 substantially present the gasketing medium from contacting the upper and lower faces of the filter material 18. Due to the structure of the upper holder, a one inch zone about the periphery of the upper face may come into contact with the medium 13. If desired, each holder may be provided with a rubber gasket (not shown) to assist in preventing the gasketing medium from contacting the upper and lower filter faces.

A vacuum is applied through the filter material 18 by pump 22, flexible hose 32, and an appropriate opening not shown in the lower filter holder 16. The vacuum level may be controlled by valve 28. The vacuum may be applied for about 1 to about 60 seconds, preferably for about 1.5 to about 3.0 seconds, at a level in the range of from about 5 to about 20 inches of mercury, preferably from about 15 to about 20 inches of mercury. The vacuum causes the gasketing medium to be drawn to the peripheral side edges of the filter 18. One of the advantages attendant to this method is that the edge configuration, bevelled or straight, does not affect the ability to form the desired gasket. Still another advantage to this method is that the fibers are drawn into the porous filter body and cause a relatively strong adhesion between the gasket and the filter body.

After gasketing has been completed, the filter body 18 is removed from the tank 12. The vacuum is continued for about 5 to about 300 seconds, preferably from about 10 to about 120 seconds, to promote dewatering.

Occasionally, the gasketing procedure of the present invention leaves water in the filter which must be removed prior to shipping. Any suitable technique known in the art, such as air drying, convection drying, microwave drying, or combinations thereof, may used to dry the filters. Depending on the drying procedure utilized, it may be necessary to dry the filters for up to 12 hours. Suitable drying temperatures are in the range of 200°–400° F. This low temperature drying is a result of the binders used in the medium 13 and is quite advantageous.

The instant gasketing method may leave some fiber whiskers extending from the gasket. Although the whiskers do not adversely affect filtration, they may be trimmed off for aesthetic reasons.

It has been found that using the above method one can produce a gasket about the filter which has a thickness between about 1/16" and ¼", an adhesion factor of about 0.05 to 10 pounds and preferably from about 1.8 pounds to about 2.5 pounds, a compression factor of about 2 to about 100 pounds and preferably from about 25 pounds to about 42 pounds, a density in the range of from about 0.05 g/cc to about 0.5 g/cc, a warpage of less than 0.09 inches, a resilience factor of about 90% (returns to original thickness within 30 seconds) and an expansion temperature in the range of 250°–275° C. The bond between the gasket and the filter body has been found to be both chemical and mechanical. The improved adhesion between the gasket and the filter body is due to this type of bond and to absence of blockage, during the procedure, of the porous attachment and penetration surfaces which allow partial fiber penetration in the porous filter body.

To illustrate the manner in which filters in accordance with the present invention may be formed, the following examples were performed.

EXAMPLE I

A gasket forming medium was prepared by first adding 550 grams of ceramic fibers having a maximum length of about 100 mm and a diameter of from about 2 microns to about 3 microns to 95 liters of water and mixing for about 15 minutes. Thereafter 7.5 grams of colloidal silica was added to the gasket forming medium. The medium was then mixed for another 15 minutes.

After mixing was complete, a ceramic foam filter body which had been previously fired was immersed in the gasketing medium using an apparatus similar to that shown in the FIGURE. Rubber gaskets were used to assist in preventing the gasketing medium from contacting the upper and lower filter faces. A vacuum was then applied at a level of 18 inches of mercury for 2 seconds. The vacuum caused the gasketing medium to be drawn to the peripheral side edges of the filter body. The filter body was then removed from the tank. Excess water was taken off by applying the vacuum for approximately 90 seconds. The filter body was thereafter dried in air for 120 hours. A satisfactory non-expandable gasket having a density of about 0.096 g/cc was thus formed.

EXAMPLE II

A second non-expandable gasket was formed from a gasketing medium containing colloidal silica and starch. The gasketing medium was prepared by first adding 550 grams of ceramic fibers as in Example I to 95 liters of water. The fibers and water were then mixed for 15 minutes. Thereafter, 6 grams of colloidal silica and 1 gram of starch were added and the medium was mixed for another 15 minutes.

A ceramic foam filter body was then immersed in the solution and processed as in Example I. A satisfactory gasket was thus formed on the filter body.

EXAMPLE III

An expandable gasket was formed on a ceramic foam filter body in the following manner. A gasketing medium was prepared by initially adding 550 grams of ceramic fiber as in Example I and 150 grams of vermiculite to 100 liters of water and mixing for about 10 minutes. Thereafter, 9 grams of colloidal silica was added. The medium was then mixed for an additional ten minutes.

A ceramic foam filter body was then immersed in the solution and processed as in Example I. A satisfactory expandable gasket was thus formed on the filter body.

It is within the purview of the present invention to form a composite gasket having an expandable layer covered by a thin layer of non-expandable gasketing material. It has been found that such composite gaskets have reduced flaking because the non-expandable gasketing overlayer doesn't snow. The composite gasket may be formed by first immersing a filter body in a first expandable gasket medium such as that described in Example III in a tank 12 and applying a vacuum at a level of from about 5 to about 20 inches of mercury for about 1 to about 60 seconds. The filter is then removed from the first solution and immersed in a second non-expandable gasketing medium such as that in Example I in a tank 12'. A vacuum at the aforementioned level is again applied for about 1 to 60 seconds. The filter is removed from the second medium, dewatered and finally dried. Dewatering and drying are carried out as described hereinabove. The time the filter body resides in each medium determines the thickness of the expandable gasket layer and the non-expandable gasket overlayer.

It is also possible to form a composite gasket having a non-expandable gasket layer covered by an expandable gasket layer. To form such a composite gasket, the filter body is first immersed in the non-expandable gasketing medium and then immersed in the expandable gasketing medium. Dewater and drying steps are performed thereafter in the previously described manner.

In yet another embodiment of the present invention, snowing of the gasketed filter body may be minimized by spraying a binder such as starch over at least the gasket formed on the peripheral side edges of the filter body. Spraying may be carried out in any desired manner. It has been found that the spraying step has particular utility with gasketed filter bodies having an expandable gasket.

Prior to use, gasketed filter bodies formed in accordance with the present invention may be preheated. It has been found that preheating protects the filter from a thermal shock point of view and gives the gasket a chance to rid itself from binder fumes, thus preventing bubbling.

In accordance with the present invention, utilizing the described procedure, equipment and materials, a ceramic filter gasketing is made which has the following improved characteristics:

Better seal, better filtration

No need to glue, tape, or cement

No environmentally hazardous chemical used in formation

Shorter preheating time required due to the use of low concentration of simple binders and temperature expansion materials Elimination of regassing problems Improved mechanical performance of filters with expandable gaskets Aesthetically pleasing A practical choice for total automation Economically attractive—low material cost and material handling It is apparent that there has been provided in accordance with this invention improvements in filter gasketing which fully satisfies the objects, means, and advantages set forth hereinbefore. While the invention has been described in combination with specific embodiments thereof, it is evident that many alternative, modifications, and variations will be apparent to those skilled in the art in light of the foregoing description. Accordingly, it is intended to embrace all such alternative, modifications, and variations as fall within the spirit and broad scope of the appended claims.

What is claimed is:

1. A filter suitable for use in the filtration of molten metal, said filter comprising:
    a filter body formed by a porous ceramic foam filter material;
    a gasket about peripheral edges of said filter material;
    said gasket being bonded both chemically and mechanically to said filter material and being characterized by the presence of a binder and by ceramic fibers at least partially penetrating into said porous ceramic foam filter material; and
    said partially penetrating ceramic fibers providing improved adhesion between the gasket and the ceramic foam filter material.

2. A filter according to claim 1 wherein said gasket material has an adhesion factor in the range of from about 0.5 to about 10 pounds and a compression factor in the range of from about 2 to about 100 pounds.

3. A filter according to claim 1 wherein said gasket material has a density in the range of from about 0.05 g/cc to about 0.5 g/cc.

4. A filter according to claim 2 wherein said gasket is formed of a material having a warpage less than about 0.09 inches and a resilience factor of about 90%.

5. A filter according to claim 4 wherein said gasket material has an expansion temperature in the range of about 250 to about 270° C.

6. A filter according to claim 2 wherein said adhesion factor is in the range of from about 1.8 to about 2.5 pounds and said compression factor is in the range of about 25 to about 42 pounds.

7. A filter according to claim 1 wherein said fibers are alumino-silicate fibers.

8. A filter according to claim 1 wherein said ceramic fibers in said gasket are low density fibers, non-wettable by said molten metal and stable at or above the melting point of said molten metal.

9. A filter according to claim 8 wherein said fibers have a length in the range of from about 0.1 to about 100 mm and a diameter in the range of from about 0.1 to about 50 microns.

10. A filter according to claim 1 wherein said ceramic fibers are drawn into said porous ceramic foam filter material as a result of the application of a vacuum to said ceramic foam filter material which draws into gasket material into said ceramic foam filter material.

* * * * *